United States Patent
Rubinstein et al.

(10) Patent No.: US 9,524,490 B2
(45) Date of Patent: Dec. 20, 2016

(54) CONTENT REPORT MANAGEMENT IN A SOCIAL NETWORKING SYSTEM

(71) Applicant: Facebook, Inc., Menlo Park, CA (US)

(72) Inventors: Yigal Dan Rubinstein, Los Altos, CA (US); Mitu Singh, San Carlos, CA (US); Qing Guo, Mountain View, CA (US); Arturo Bejar, Saratoga, CA (US); Arda Cebeci, Dublin (IE)

(73) Assignee: Facebook, Inc., Menlo Park, CA (US)

( * ) Notice: Subject to any disclaimer, the term of this patent is extended or adjusted under 35 U.S.C. 154(b) by 296 days.

(21) Appl. No.: 14/465,826

(22) Filed: Aug. 21, 2014

(65) Prior Publication Data

US 2014/0365382 A1 Dec. 11, 2014

Related U.S. Application Data

(63) Continuation of application No. 13/316,352, filed on Dec. 9, 2011, now Pat. No. 8,849,911.

(51) Int. Cl.
  *G06F 15/16* (2006.01)
  *G06Q 10/10* (2012.01)
  *H04L 12/58* (2006.01)
  *G06Q 50/00* (2012.01)
  *G06Q 50/18* (2012.01)

(52) U.S. Cl.
  CPC ............ *G06Q 10/10* (2013.01); *G06Q 50/01* (2013.01); *G06Q 50/182* (2013.01); *H04L 51/12* (2013.01); *H04L 51/32* (2013.01)

(58) Field of Classification Search
  CPC ......... H04L 51/32; H04L 51/12; G06Q 10/10; G06Q 50/01; G06Q 15/16
  USPC .................................................. 709/200, 204
  See application file for complete search history.

(56) References Cited

U.S. PATENT DOCUMENTS

| | | | | |
|---|---|---|---|---|
| 7,945,653 B2* | 5/2011 | Zuckerberg | ............ | G06Q 30/02 709/206 |
| 8,200,587 B2* | 6/2012 | Deyo | ..................... | G06Q 10/10 706/12 |
| 8,225,413 B1* | 7/2012 | De | ...................... | G06F 21/6245 726/22 |
| 8,543,929 B1* | 9/2013 | Holloway | .............. | G06Q 10/10 715/757 |
| 8,572,199 B2* | 10/2013 | Piper | .................... | G06Q 10/101 709/204 |
| 8,572,277 B2* | 10/2013 | Morris | ................... | G06F 21/31 709/206 |
| 8,732,590 B2* | 5/2014 | Barker | ............. | G06F 17/30185 715/753 |
| 2005/0171799 A1* | 8/2005 | Hull | ..................... | G06Q 10/107 705/319 |

(Continued)

*Primary Examiner* — Anthony Mejia
(74) *Attorney, Agent, or Firm* — Fenwick & West LLP

(57) ABSTRACT

User reports concerning inappropriate content are received by a social networking system and are put into a content report management process that routes the reports into other handling processes based upon the reporting user's identification of the report type. Reports concerning content that is related to the reporting user are routed into a social resolution process that resolves the complaint through self-help and social resolution. Other reports are handled by a content review process that resolves complaints through automated methods as well as manual review by human agents.

20 Claims, 4 Drawing Sheets

(56) References Cited

U.S. PATENT DOCUMENTS

| | | | |
|---|---|---|---|
| 2008/0065405 A1* | 3/2008 | Adelman | G06Q 10/10 705/319 |
| 2008/0070697 A1* | 3/2008 | Robinson | A63F 13/12 463/42 |
| 2008/0071901 A1* | 3/2008 | Adelman | G06Q 30/0277 709/223 |
| 2008/0086458 A1* | 4/2008 | Robinson | A63F 13/12 |
| 2008/0091723 A1* | 4/2008 | Zuckerberg | G06Q 30/02 |
| 2008/0228868 A1* | 9/2008 | Sivakoff | G09B 7/02 709/203 |
| 2008/0282324 A1* | 11/2008 | Hoal | G06Q 30/02 726/3 |
| 2009/0094287 A1* | 4/2009 | Johnson | G06Q 30/0603 |
| 2009/0113040 A1* | 4/2009 | Zalewski | G06Q 10/00 709/224 |
| 2009/0132689 A1* | 5/2009 | Zaltzman | G06Q 10/00 709/223 |
| 2009/0132933 A1* | 5/2009 | Faski | G06Q 10/10 715/753 |
| 2009/0198566 A1* | 8/2009 | Greenberg | G06Q 30/02 707/727 |
| 2009/0254499 A1* | 10/2009 | Deyo | G06Q 10/10 706/12 |
| 2009/0271283 A1* | 10/2009 | Fosnacht | G06Q 20/123 705/26.1 |
| 2009/0288112 A1* | 11/2009 | Kandekar | G11B 27/11 725/32 |
| 2010/0030620 A1* | 2/2010 | Wannier | G06Q 30/0201 705/7.29 |
| 2010/0031148 A1* | 2/2010 | Rivera | G06Q 10/10 715/716 |
| 2010/0064006 A1* | 3/2010 | Chaintreau | G06Q 10/047 709/204 |
| 2010/0094728 A1* | 4/2010 | Denning | G06Q 30/02 705/26.1 |
| 2010/0146054 A1* | 6/2010 | Armstrong | G06F 17/30867 709/205 |
| 2010/0174722 A1* | 7/2010 | Carteri | G06F 17/30781 707/748 |
| 2010/0217721 A1* | 8/2010 | Wormald | G06Q 50/01 705/319 |
| 2010/0318510 A1* | 12/2010 | Ryu | G06F 17/30265 707/722 |
| 2011/0035264 A1* | 2/2011 | Zaloom | G06Q 10/10 705/14.12 |
| 2013/0185220 A1* | 7/2013 | Good | G06Q 50/01 705/329 |

* cited by examiner

CONTENT REPORT MANAGEMENT IN A SOCIAL NETWORKING SYSTEM

CROSS-REFERENCE TO RELATED APPLICATIONS

This application is a continuation of co-pending U.S. application Ser. No. 13/316,352, filed on Dec. 9, 2011, which is hereby incorporated by reference in its entirety.

BACKGROUND

This invention relates generally to social networking, and in particular to the management of user reports related to offensive, harassing, or "spammy" content in a social network system.

Social networking systems allow users to create accounts that are tied to their identities. The social networking system allows users to post objects, such as photos and videos, and to take actions, such as commenting and messaging (collectively the objects and actions are called "content"). Occasionally users of the social networking system will encounter content from other users that is offensive, harassing, spammy, or otherwise objectionable to the recipient and/or against the usage policies of the social networking system (collectively called "inappropriate" content). Social networking systems allow users to generate reports identifying inappropriate content as they encounter it. Typically a social networking system manages these reports through a review process. The review process must handle the case where content is reported that is not inappropriate. The social networking system cannot simply block all content that every user reports as this may lead to overbroad censorship of content on the social networking system. The social networking systems review process must contain checks to ensure that only truly inappropriate content is blocked. For example, when a social networking system receives a report from a user that identifies an allegedly offensive photo, the review process may use a human agent to review the photo to confirm that is in fact offensive.

Manual review of reported content may require significant human resources. In recent years, the volume of reports from users of social networking systems has made the management of these reports an overwhelming task. In many cases users report content that is not inappropriate simply because they find the content embarrassing or uncomplimentary. For example, a user may report a photo as spam, where the photo merely contains an uncomplimentary image of him. Reviewing such unjustified reports consumes resources and creates delays in resolving other legitimate reports.

For these reasons there has been a pressing need for a system that can satisfactorily resolve user reports without consuming human resources, while reducing the number of unjustified reports that are submitted to the content reviewing process.

SUMMARY

A social networking system provides a method for managing a content report received from a reporting user of the system, where the report indicates reported content posted by a content owner that is allegedly inappropriate. In response to receiving a report of content, the social networking system sends reporting options for display to the reporting user. The system then receives from the reporting user a reporting option selection.

In one embodiment, responsive to receiving the selected reporting option indicating that the reported content is related to the reporting user, the social networking system initiates a social resolution process that comprises sending social reporting options for display to the reporting user. The reporting user selects a social reporting option that indicates a complaint type. Responsive to receiving the complaint type, the social networking system offers the reporting user self-help and social resolution options, such as the ability to message a trusted third-party to resolve bullying, block a user that is posting harassing comments, and/or untag or otherwise disassociate the reporting user with an unflattering photo.

In one embodiment, responsive to receiving the selected reporting option indicating that the reported content is not related to the reporting user, the social networking system initiates a content review process. In the content review process, a confidence score is generated for the reported content, where the confidence score comprises a measure of the probability that the reported content is inappropriate. Based on the confidence score, the social networking system either sends a request to the content owner to delete the reported content, or sends information to the reporting user about what actually constitutes inappropriate content and asks them to reconfirm the content report.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
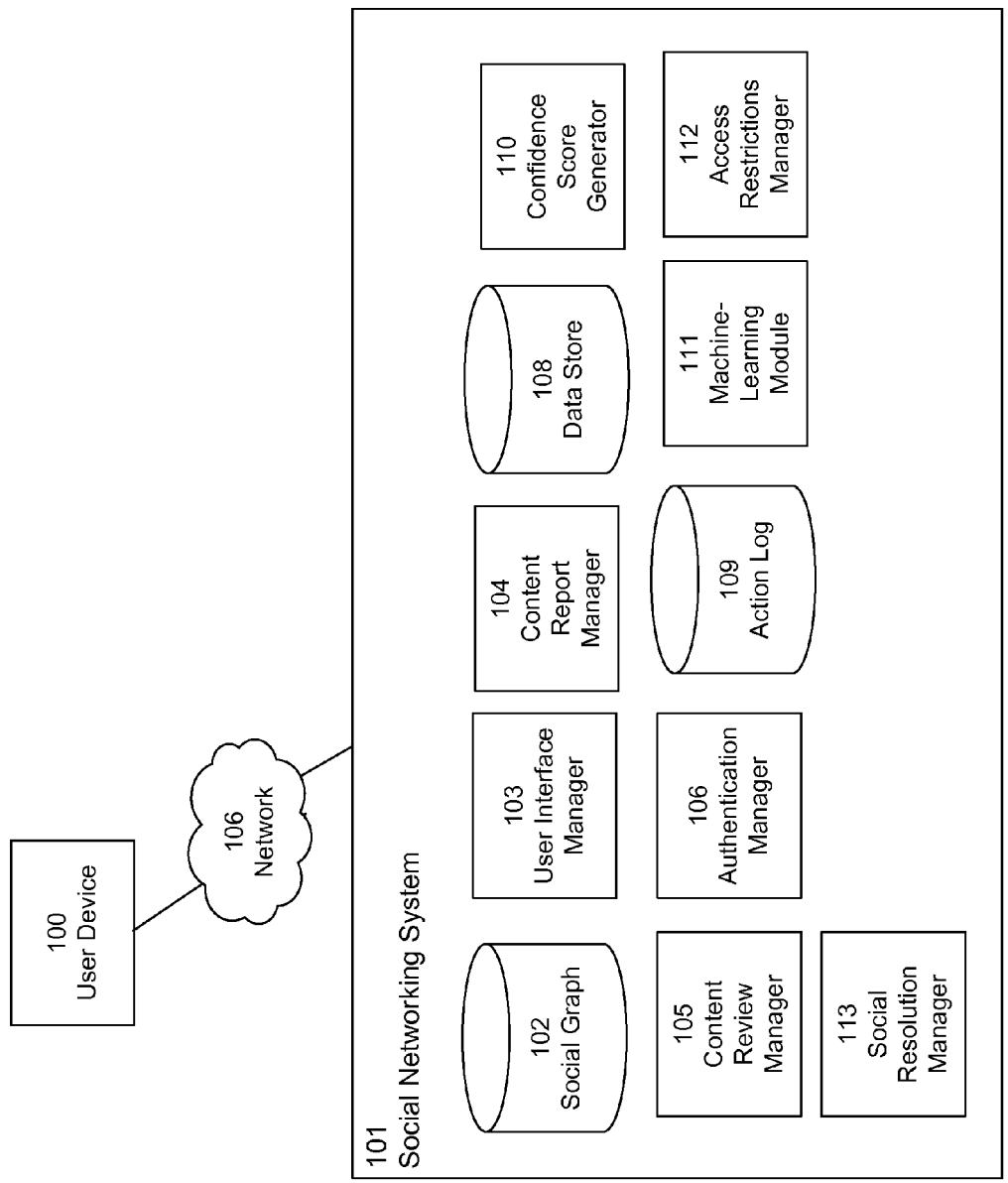
FIG. 1 illustrates a social networking system environment in which one embodiment of the content report management process is implemented.

Overview of the Social Networking System Environment for Content Report Management FIG. 1 is a high-level block diagram of the social networking system environment in which the content report management process operates, according to one embodiment. FIG. 1 shows a single user device 100 communicating with a social networking system 101, over a network 106. Although one user device 100 and one social networking system 101 are illustrated in this figure, in practice there may be many user devices 100 and many social networking systems 101 connected over the network 106.

The social networking system 101 allows users to create accounts and establish links with other users of the social networking system 101. When two users become linked, they are said to be "connections," "friends," "contacts," or "associates" within the context of the social networking system 101. The social networking system 101 includes a social graph 102. The social graph 102 stores the connections that each user has with other users of the social networking system 101.

The social networking system provides a user with various ways to communicate with other users, for example, by email (internal and external to the social networking system), instant message, text message, phone, and the like. The social networking system allows a user to share new content items (such as photographs, videos, and URLs) as well as to view, comment on, download, endorse, or report another user's content items.

The social networking system 101 maintains a user account for each user that has joined the social networking system. The user that has created an account on the social networking system is referred to as the "account-holder" for that account. Any action that a particular user communicates to the social networking system 101 is associated with the user's account, through information maintained in an action log 109. Such actions may include, for example, adding a link to the another user, sending a message to another user, reading a message from another user, viewing content associated with another user, attending an event posted by another user, among others. The action log 109 stores a log of actions of a user and those of other users with whom the user has established a connection in the social networking system (i.e., the user's connections). A log entry for an action may include the time of occurrence of the action, a type of action performed, the user who performed the action, an object on which the action was performed, and any other information related to the action, such as the content of a user's comment or a location associated with the action. For example, in the action 'Adrian bought a ring at Tiffany & Co.,' the type of action is buying, the object is a ring and extra information includes where the ring was bought, Tiffany & Co. The actions may be taken online either within the social networking system 101 or outside of it, or they may be actions performed in the real world and recorded and communicated to the social networking system 101.

The social networking system 101 also maintains a user profile with each account. The user profile describes the account-holder's characteristics such as work experience, educational history, hobbies, location, or similar data, and may also include data describing one or more relationships between the account-holder and other users. Account-holders may also post messages specifically to their profiles in the form of "status updates." Users of a social networking system may view the profiles of other users if they have the permission. In some embodiments, becoming a connection of an account-holder automatically provides the permission to view the account-holder's profile. Each user account on the social networking system typically has a single user profile associated with it. In addition to the profile, an account may have a "wall" associated with it. The wall is a place where other users may post content directed at the account-holder. Permission to post content to a user's wall may be restricted to the user's immediate connections or friends.

Although many user accounts are created by individuals for themselves, other user accounts may be created by individuals for organizations such as non-profits or corporations. In such cases, although an officer of the organization may create the account, the account-holder for that account is considered to be the organization rather than the individual officer creating the account.

The user profile associated with an account may reveal the real identity of the account holder. For example, the real name of an individual, celebrity or organization. The social networking system may require that account-holders reveal their real identities, and that they do not impersonate other people or entities through their user profiles.

Generally being linked in a social networking system 101 allows linked users access to more information about each other than would otherwise be available to unlinked users.

A user interacts with the social networking system 101 using a user device 100, such as a personal computer or a mobile phone. The user may interact with the social networking system 101 via a web application running in a web browser executing on the user device 100; or the user may interact with the social networking system 101 through a native application running on the user device 100. These applications may be downloaded to the user device 100 from the social networking system 101, or they may be provided by a third party. Typical interactions between the user device 100 and the social networking system 101 include operations such as creating an account, viewing profiles associated with other accounts, contributing and interacting with media items, joining groups, listing and confirming attendance at events, checking in at locations, liking certain pages, creating pages, and performing other tasks that facilitate social interaction. A user connected through a user device 100, to the social networking system 101, may also create a content report to complain about content posted by another user on the social networking system 100. The social networking system 101 initiates a content report management process to deal with such content reports, as described in more detail herein.

The network 106 is the Internet or another system of interconnected computer networks that use standard communications technologies and/or protocols to facilitate data transmission. Thus, the network 106 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML) and the extensible markup language (XML). In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The social networking system 101 includes a user interface manager 103 that allows a social networking system user to interact with the social networking system 101 through a social networking system interface. For example, the user interface manager 103 may generate one or more web pages that are displayed on the user device 100, where the web pages display social networking system data such as images, video, user profiles, etc. The user interface manager 103 also generates the interfaces necessary for the social networking system 101 to request and receive information from the user operating the user device 100. For example, the user interface manager 103 may create a web page form so that a user can provide biographic information, such as the user's age, for use by the social networking system 101 in creating that user's user profile. User information is stored by the social networking system in the data store 108. User information includes not only the biographic information provided by users, but also may include content uploaded by a user such as photographs, video, status updates, blog posts etc. When other users request the user's profile page, user interface manager 103 may retrieve the user's data from the data store 108 and generate a user profile web page for display on the user device 100. When a user's content is requested by another user of the social networking system 101, the user interface manager 103 will generate and send a web page that includes that content. The generated web page with the user content may also include an interface option (such as a link or button) so that a viewing user can report the content.

The authentication manager 106 authenticates a user on user device 100 as having an account on the social networking system 101. It allows a user to log into the social networking system 101 through any user device 100 that has an application supporting the social networking system 101. In some embodiments, the authentication manager 106 validates users that connect to the social networking system 101 through third party applications.

The content report manager 104 controls the process that is used to manage content reports in the social networking system 101. Users may report content for a variety of different reasons, and the content report manager 104 manages the process of resolving them. The content report manager 104 resolves content reports by either initiating a social resolution process or a content review process. The social resolution process is invoked when a user indicates that the reported content is related to them. Content that is related to the reporting user may often be resolved using social techniques as opposed to the content review process. Social techniques include messaging the content owner to request deletion of an unflattering picture, messaging a bully to request deletion of a harassing message, etc. The social resolution process is managed by the social resolution manager 113, and is described in more detail herein.

The content report manager 104 invokes the content review process when the reporting user indicates that the reported content is not related to them (and therefore unlikely to be resolved through the social resolution process). The content review process is managed by the content review manager 105.

If the content review manager 105 receives a content report from a user that identifies allegedly inappropriate content (called the "reported content"), the content review manager 105 may use the services of the confidence score generator 110 to compute a measure of the likelihood that the accused content is actually inappropriate. The measure of likelihood that the accused content is inappropriate is called the confidence score. The confidence score generator 110 has processes that are able to generate a confidence score based on features of the content as well as data in the social graph 102, the action log 109, and data store 108 (collectively called social data). For example, the confidence score generator 110 may detect that a photo that is reported as spam has been shared with a large number of users, has many users tagged in it, and has similar image characteristics to other spam images. Based on this information the confidence score generator 110 may give the reported photo a high confidence score, which indicates to the content report manager 105 that there is a high likelihood that the photo is in fact spam.

The confidence score generator 110 may utilize the services of the machine-learning module 111 to determine the probability that a particular piece of content is inappropriate content. The machine-learning module 111 trains machine-learned models that can generate the confidence score for the reported content based on the type of report (whether for spam, pornography, racism, etc.), social data, and features of the content.

When the content review manager 105 receives a report for a piece of content that has a confidence score greater than a minimum confidence threshold, the content review manager 105 may request that the content owner delete the content. If the content owner refuses to delete the content, the content can be flagged for manual review by a human agent. The content review process is described in more detail herein.

Content Report Management Process

Figure 2A:
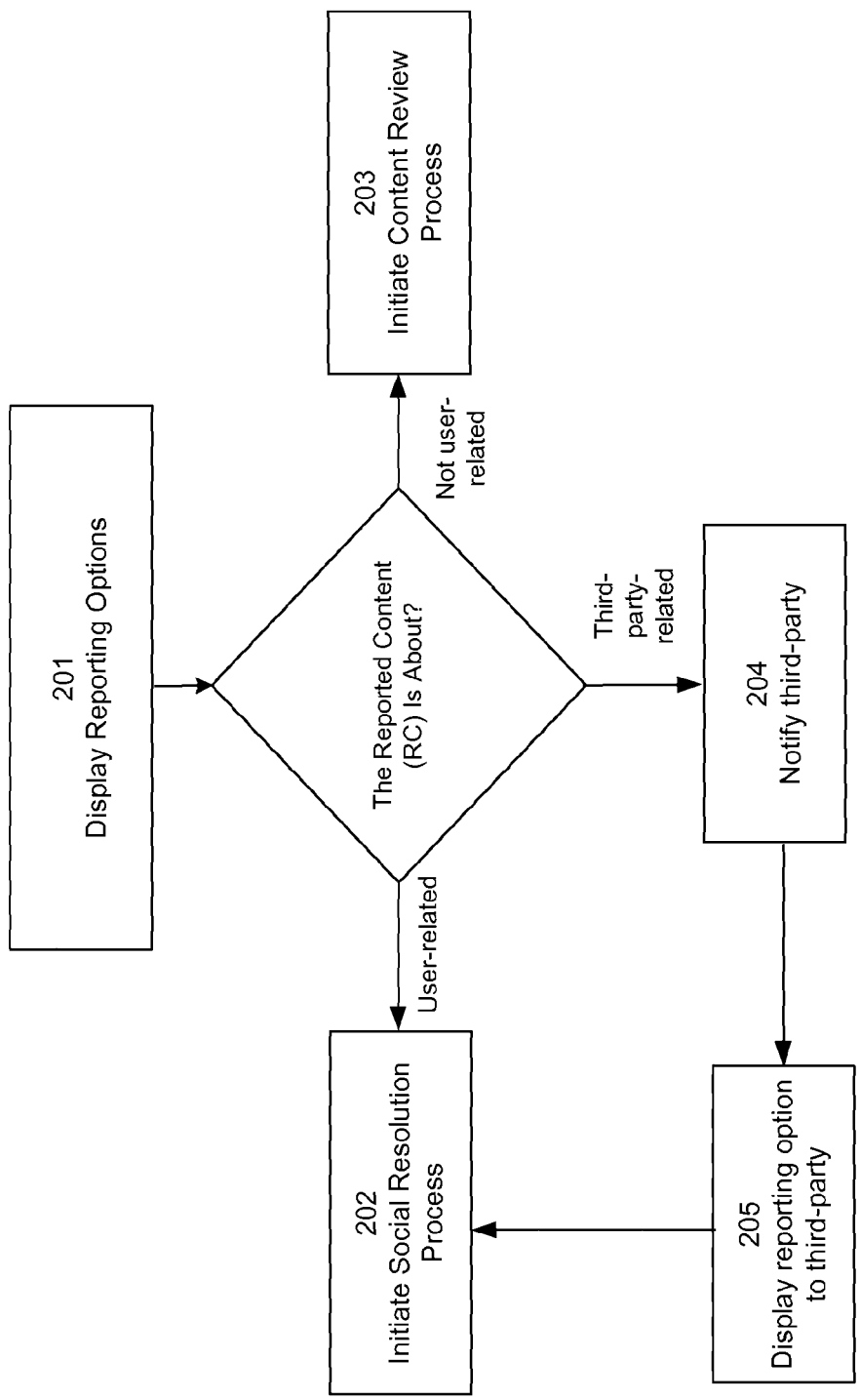
FIG. 2A is a flowchart illustrating one embodiment of a content report management process.

FIG. 2A illustrates one embodiment of the content report management process as managed by the content report manager 104. The content report management process begins when a social networking system user, called the reporting user, initiates a reporting process through the social networking system interface. The content for which the reporting process is initiated is called the reported content (RC). The reporting user may be motivated to report the RC because that content is in fact inappropriate (e.g. spam, pornography, etc.), or the reporting user may be motivated to report the RC for other personal reasons (e.g. the content may show the reporting user or a third-party in an unflattering light). The content report manager 104 displays 201 reporting options to the reporting user via the social networking system interface managed by the user interface manager 103.

When the user interface manager 103 "displays" options to the reporting user through the social networking system interface, in practice the process may involve sending the reporting options to the user device 100, where the user device 100 ultimately renders the options to a screen. These reporting options allow the reporting user to select the type of report that is appropriate for the RC. Depending on whether the RC is related to the user (e.g. an unflattering photograph, a bullying message, etc.), is not related to the user (e.g. the content is pornography, spam, hate speech, generally offensive, illegal, etc.), or is about a third-party (e.g. bullying or abusive content concerning a third-party) the content report manager may initiate different handling processes.

When the RC is related to the reporting user, the content report manager 104 initiates 202 the social resolution process. The social resolution process resolves the content report through social solutions, without requiring direct intervention by employees or agents of the social networking system 101. The social resolution process is described in more detail herein.

When the RC is not related to the reporting user, the content report manager 104 initiates 203 the content review process. The content review process resolves the content report by utilizing automatic means and also possibly human agents. The content review process is described in more detail herein.

When the RC is related to a third-party, the content report manager 104 gives the reporting user the option of notifying 204 the third-party about the RC. If the third-party does not currently have permission to view that content, the social networking system 101 may temporarily grant the third-party the ability to view the content for reporting purposes. The content report manager 104 then displays 205 reporting options to the third-party. The third-party can then initiate 202 the social resolution process.

Figure 2B:
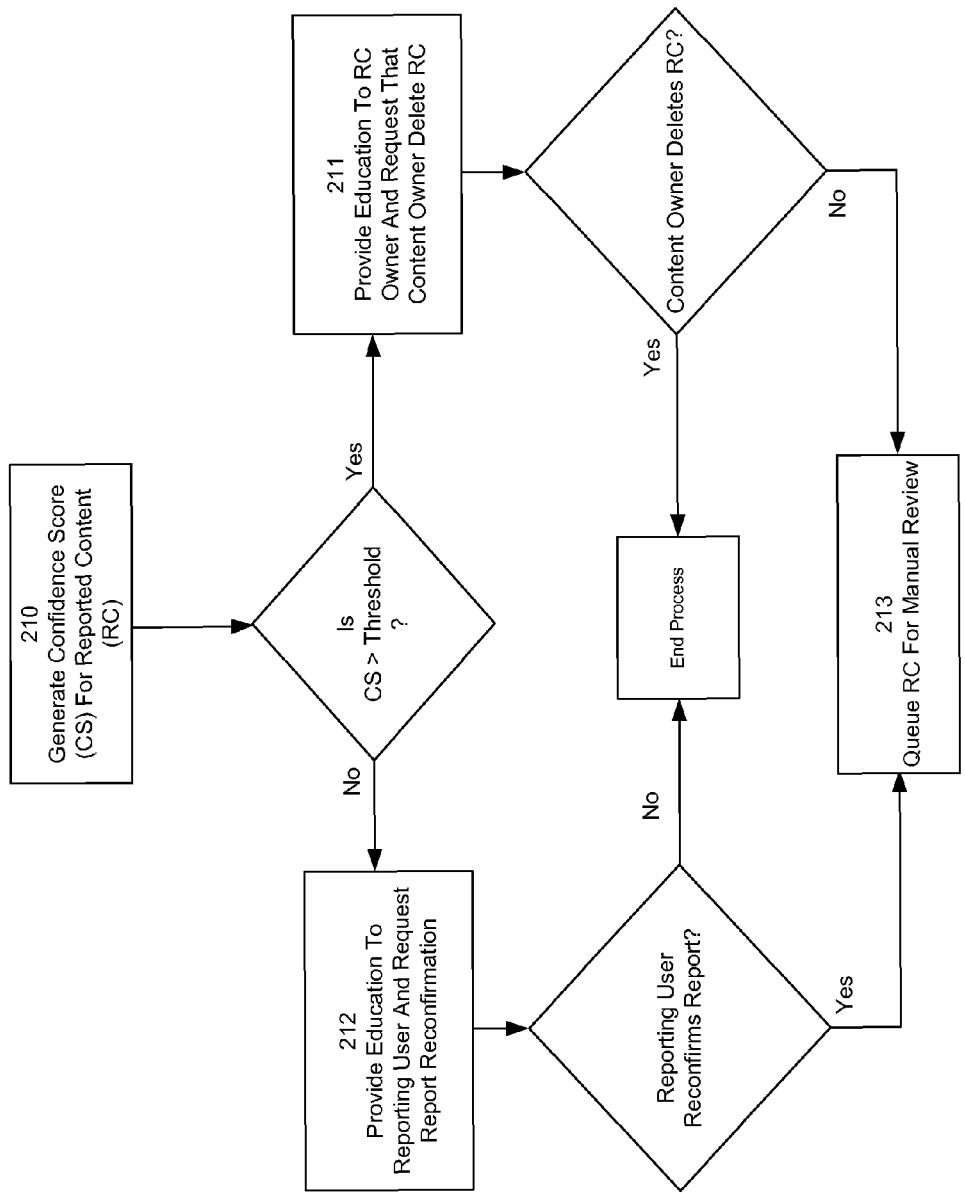
FIG. 2B is a flowchart illustrating one embodiment of a content review process.

FIG. 2B illustrates one embodiment of the content review process as managed by the content review manager 105. The content review manager 105 then utilizes the services of the confidence score generator 110 to generate 210 a confidence score (CS) for RC. The CS is a measure of the probability that RC is really inappropriate content, as opposed to mistakenly or maliciously reported innocent content.

In one embodiment CS is generated by the confidence score generator 110 using machine-learned algorithms that use social data to determine the probability that content is inappropriate. The machine-learned algorithms may be trained by the machine-learning module 111. The machine-learned algorithms are trained to recognize the characteristics of content that are correlated with various sorts of inappropriate content like pornography, spam, etc. For example, a photograph with certain skin tones and many unrelated users tagged in it may be recognized as pornographic spam based on these characteristics. The machine-learning module 111 may provide different machine-learned algorithms to calculate CS based on the type of inappropriate content identified by the reporting user. For example, different machine-learned algorithms may be selected to generate CS based on the content being identified as a spam photo versus a racist photo.

Once CS is determined, the content review manager 105 compares the CS against a minimum confidence threshold. The minimum confidence threshold is a value that is set by the social networking system 101, and which is a measure of the minimum probability of inappropriateness that must exist before the content review manager 105 contacts the owner of the reported content. Since the content review process may be burdensome to the content owner, the social networking system 101 may set this minimum threshold to avoid burdening users that have posted content that has only a low probability of being inappropriate. The minimum confidence threshold may be set by the social networking system 101 based on a global policy, or the threshold may be set based on other factors assessed by the social networking system 101, such as the type of RC (whether photo, video, or text, for example), or demographics of the reporting user or content owner.

If CS is greater than the minimum confidence threshold, then the content review manager 105 provides 211 educational information to the content owner that informs the content owner that the material they have posted—i.e., the RC—is inappropriate. The type of educational information that the content owner receives may be based on the type of inappropriate material identified by the reporting user in the content report. For example, the educational information will be different if RC is alleged to be pornography versus if it is alleged to be spam. The content review manager 105 then requests 211 that the content owner delete RC from the social networking system 101. Requests like this, as well as others, from the social networking system 101 may be communicated to the content owner through the social networking system interface managed by the user interface manager 103, or they may be sent through another form such as email, SMS message, etc.

If the content owner deletes RC, the process is concluded. If the content owner does not delete RC, then the content review manager 105 queues 213 RC for manual review. In the manual review process a human agent examines RC and determines if RC is really inappropriate content. If RC is determined to be inappropriate the human agent may delete RC. In addition, the human agent may enroll the content owner in a "timeout" administered through the access restrictions manager 112. The timeout administered through the access restrictions manager 112 restricts the content owner's ability to post new content for a period of time. The timeout period can be extended if the content owner posts inappropriate content repeatedly. If the human agent determines that RC is not inappropriate content (i.e. the content owner is innocent), then RC will not be deleted. In addition, the reporting user may be given a timeout through the access restrictions manager 112 that prevents them from filing additional content reports for a time period. The time period can be extended if the reporting user repeatedly reports innocent content.

If CS is less than the minimum confidence threshold, then the content review manager 105 provides 212 educational information to the reporting user that reminds the reporting user about what types of content are inappropriate. The content review manager 105 then requests 212 that the reporting user reconfirm the content report. If the reporting user does not reconfirm the report, then the content review process is terminated, and the content report is considered resolved. If the reporting user does reconfirm the content report then RC is queued for manual review by a human agent as described above.

Figure 2C:
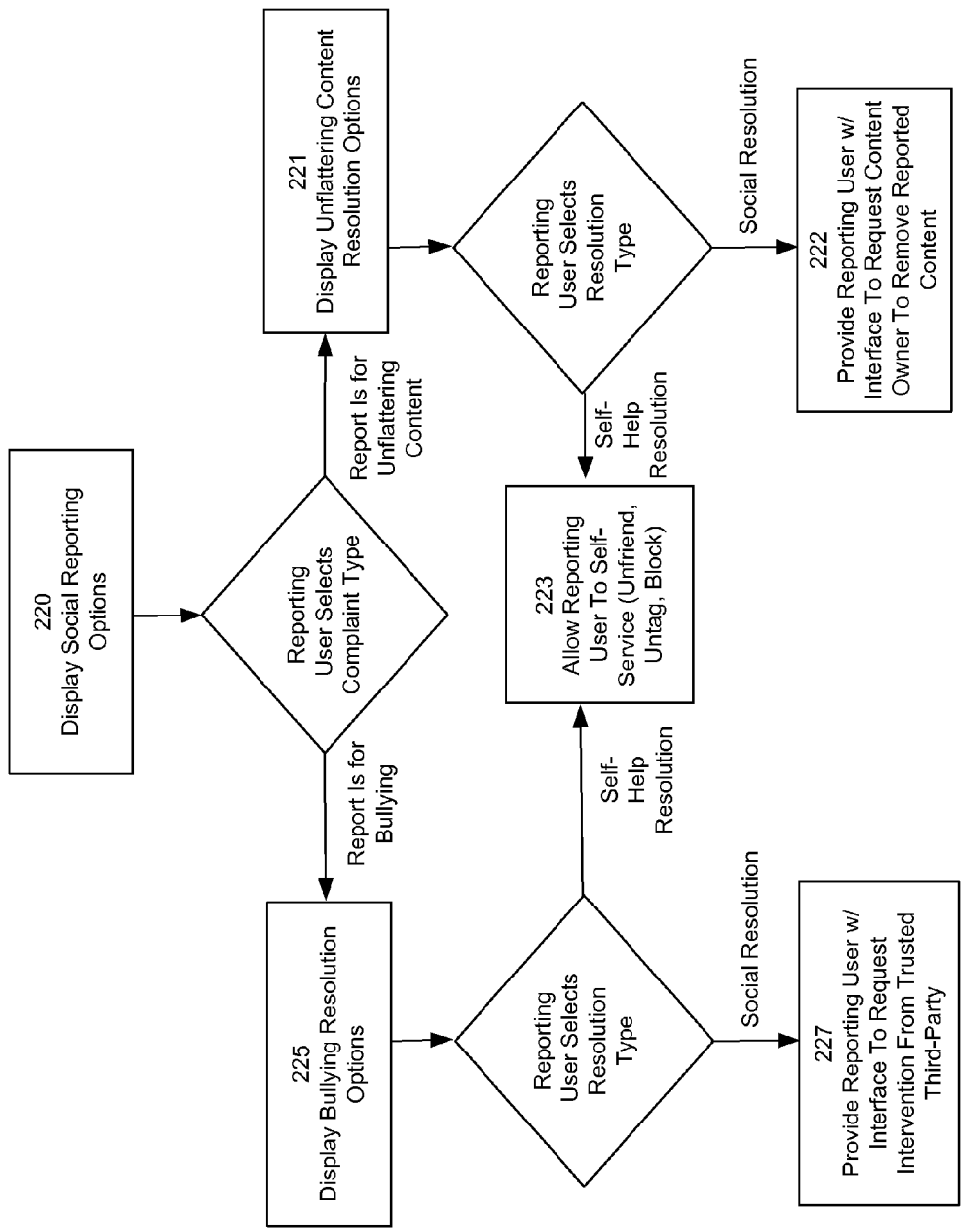
FIG. 2C is a flowchart illustrating one embodiment of a social resolution process.

FIG. 2C illustrates one embodiment of the social resolution process managed by the social resolution manager 113. The social resolution process is designed to help the reporting user resolve the underlying reason for their content report without directly involving the social networking system 101. The social resolution manager 113 achieves this goal by providing the reporting user with self-help options and social resolution options as described below.

The content report manager 104 initiates the social resolution process as a result of the reporting user confirming that they object to RC because it is related to them. The social resolution manager then displays 220 social reporting options to the reporting user through the social networking interface managed by the user interface manager 103. The social reporting options allow the reporting user to select the complaint type that they have against RC, e.g., the RC may be unflattering, bullying, or otherwise unwanted by the reporting user. Based on these categories, the reporting user is able to select an option to resolve their complaint. FIG. 2C shows only two options, report for bullying and report for unflattering content, but other options are also possible, such as stalking, sexual harassment, etc. Based on the selected complaint type, the social resolution manager 113 offers the reporting user different resolution options.

For example, if the reporting user indicates that the RC is unflattering content (such as an unflattering photo) the social resolution manager 113 may display 221 resolution options for that particular complaint type through the social networking interface managed by the user interface manager 103. In this case the reporting user can choose to self-service 223, for example by untagging the content, blocking the content, or unfriending the content owner. Or the reporting user can choose social resolution, in which case the social resolution manager 113 will provide 222 an interface to the reporting user so that they can message the content owner to request that they remove the RC. In the case where the reporting user does not have permission to message the content owner directly (e.g. when the content owner is not a friend, or has blocked the reporting user), the social resolution manager 113 can provide the reporting user with an interface to send a message through a third-party that is connected to both the reporting user and the content owner.

In another example, if the reporting user indicates that the RC is bullying, the social resolution manager 113 may display 225 resolution options to resolve the bullying through the social networking interface managed by the user interface manager 103. Again the reporting user can choose between self-help and social resolution. In this case if the reporting user chooses social resolution, the social resolution manager 113 will provide 227 an interface so that the reporting user can compose a message to a trusted third-party (such as a teacher) to notify them of the bullying. The social resolution manager 113 will automatically attach the necessary context to the message, including the bullying content, RC. The self-help resolution is identical to the earlier example. The social resolution manager 113 allows the reporting user to self-service 223 by untagging the bullying content, blocking it, or unfriending the content owner.

Additional Concerns

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving a report about reported content posted by a content owner, the reported content reported by a reporting user of a social networking system;
receiving an indication from the reporting user about whether the reported content is related to the reporting user; and
responsive to receiving the indication that the reported content is not related to the reporting user, initiating a content review process; and
responsive to receiving the indication that the reported content is related to the reporting user, initiating a social resolution process.

2. The method of claim 1 wherein the content review process further comprises:
generating a confidence score from the reported content, the confidence score comprising a measure of the probability that the reported content is inappropriate;
comparing the confidence score to a minimum confidence threshold; and
responsive to the confidence score exceeding the minimum confidence threshold, sending a request to the content owner to delete the reported content.

3. The method of claim 2, further comprising, responsive to the confidence score not exceeding the minimum confidence threshold, sending a request to the reporting user to reconfirm the content report.

4. The method of claim 3, further comprising, responsive to the reporting user reconfirming the content report, queuing the reported content for manual review.

5. The method of claim 2, further comprising, responsive to the content owner declining to delete the reported content, queuing the reported content for manual review.

6. The method of claim 1, wherein the social resolution process further comprises:
receiving a social reporting option selection indicating a complaint type from the reporting user; and
responsive to receiving the social reporting option selection indicating the complaint type, sending resolution options for display to the reporting user based on the complaint type, the resolution options comprising one or more social interactions.

7. The method of claim 6, wherein the one or more social interactions further comprise options that allow the reporting user to unfriend and block the content owner.

8. The method of claim 6, wherein the one or more social interactions further comprise an option that allows the reporting user to untag content that depicts the reporting user.

9. The method of claim 6, wherein the one or more social interactions further comprise an option that allows the reporting user to send a message to a trusted third-party, the message containing an attachment of the reported content.

10. The method of claim 6, wherein the one or more social interactions further comprise an option that allows the reporting user to send a message to the content owner, the message containing a request to delete the reported content.

11. The method of claim 6, further comprising:
receiving from the reporting user a selection of a resolution option, and
performing the one or more social interactions associated with the selected resolution option on behalf of the reporting user in the social networking system without involvement of a human agent administrator.

12. A computer program product comprising a non-transitory computer-readable storage medium containing computer program code for:
   receiving a report about reported content posted by a content owner, the reported content reported by a reporting user of a social networking system;
   receiving an indication from the reporting user about whether the reported content is related to the reporting user; and
   responsive to receiving the indication that the reported content is not related to the reporting user, initiating a content review process; and
   responsive to receiving the indication that the reported content is related to the reporting user, initiating a social resolution process.

13. The computer program product of claim 12 wherein the content review process further comprises:
   generating a confidence score from the reported content, the confidence score comprising a measure of the probability that the reported content is inappropriate;
   comparing the confidence score to a minimum confidence threshold; and
   responsive to the confidence score exceeding the minimum confidence threshold, sending a request to the content owner to delete the reported content.

14. The computer program product of claim 13, further comprising, responsive to the confidence score not exceeding the minimum confidence threshold, sending a request to the reporting user to reconfirm the content report.

15. The computer program product of claim 14, further comprising, responsive to the reporting user reconfirming the content report, queuing the reported content for manual review.

16. The computer program product of claim 13, further comprising, responsive to the content owner declining to delete the reported content, queuing the reported content for manual review.

17. The computer program product of claim 12, wherein the social resolution process further comprises:
   receiving a social reporting option selection indicating a complaint type from the reporting user; and
   responsive to receiving the social reporting option selection indicating the complaint type, sending resolution options for display to the reporting user based on the complaint type, the resolution options comprising one or more social interactions.

18. The computer program product of claim 17, wherein the one or more social interactions further comprise an option that allows the reporting user to untag content that depicts the reporting user.

19. The computer program product of claim 17, wherein the one or more social interactions further comprise an option that allows the reporting user to send a message to a trusted third-party, the message containing an attachment of the reported content.

20. The computer program product of claim 17, wherein the one or more social interactions further comprise an option that allows the reporting user to send a message to the content owner, the message containing a request to delete the reported content.

* * * * *